(12) United States Patent
Roman Cuesta et al.

(10) Patent No.: US 12,463,833 B2
(45) Date of Patent: Nov. 4, 2025

(54) GRANTING PERMISSIONS AND ACCESSES TO DEVICES AND THIRD PARTIES

(71) Applicant: Apple Inc., Cupertino, CA (US)

(72) Inventors: Manuel Roman Cuesta, Sunnyvale, CA (US); Brandon K. Leventhal, San Francisco, CA (US); Keith W. Rauenbuehler, San Francisco, CA (US); Florian Galdo, Emerald Hills, CA (US)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 18/141,886

(22) Filed: May 1, 2023

(65) Prior Publication Data

US 2023/0396451 A1 Dec. 7, 2023

Related U.S. Application Data

(60) Provisional application No. 63/348,858, filed on Jun. 3, 2022.

(51) Int. Cl.
*H04L 9/32* (2006.01)
(52) U.S. Cl.
CPC .......... *H04L 9/3268* (2013.01); *H04L 9/3213* (2013.01)
(58) Field of Classification Search
CPC ............................ H04L 9/3268; H04L 9/3213
USPC ........................................................ 713/156
See application file for complete search history.

(56) References Cited

U.S. PATENT DOCUMENTS

| 10,728,044 | B1 * | 7/2020 | Melo ..................... H04L 9/0825 |
| 11,601,288 | B1 * | 3/2023 | Bacon .................. H04L 63/205 |
| 2006/0048233 | A1 * | 3/2006 | Buttross ................ G07C 9/215 |
| | | | 726/28 |
| 2014/0044265 | A1 * | 2/2014 | Kocher .............. H04L 63/0823 |
| | | | 380/277 |
| 2014/0359705 | A1 | 12/2014 | Karp et al. |
| 2015/0256345 | A1 * | 9/2015 | Vaid ..................... H04L 9/3268 |
| | | | 713/158 |
| 2017/0012967 | A1 * | 1/2017 | Holloway ........... H04L 63/0823 |

(Continued)

OTHER PUBLICATIONS

International Patent Application No. PCT/US2023/024181, "International Search Report and the Written Opinion", Aug. 22, 2023, 10 pages.

(Continued)

*Primary Examiner* — Thanh T Le
(74) *Attorney, Agent, or Firm* — Kilpatrick Townsend & Stockton LLP

(57) ABSTRACT

Aspects of the disclosure include a method for delegating the authority to create a token from an owner of a property to a sharing platform managing the reservation of the property. A method can include receiving a request to delegate authority for generating a token for a one or more accessory devices, the delegation to be to a sharing platform. Based on the request, a request for a determination of eligibility of the device for delegation of the authority. A determination of eligibility of the device for delegation of the authority can be received. An intermediate certificate from the sharing platform can be requests based on the determination of eligibility of the device. A delegation file that identifies an approved delegation of authority can be created based on using the intermediate certificate to validate the sharing platform.

20 Claims, 11 Drawing Sheets

(56) References Cited

U.S. PATENT DOCUMENTS

| | | | |
|---|---|---|---|
| 2018/0018663 A1* | 1/2018 | Van | G07F 7/0873 |
| 2018/0190051 A1 | 7/2018 | Outwater et al. | |
| 2018/0350170 A1* | 12/2018 | Wang | G06F 1/3231 |
| 2019/0319808 A1 | 10/2019 | Fallah et al. | |
| 2020/0154272 A1* | 5/2020 | Uy | H04W 12/08 |
| 2021/0081565 A1* | 3/2021 | Sakamoto | G06F 21/6245 |
| 2022/0131685 A1* | 4/2022 | Lim | H04L 9/3268 |
| 2023/0198984 A1* | 6/2023 | West, III | H04L 63/0876 |
| | | | 726/4 |

OTHER PUBLICATIONS

International Patent Application No. PCT/US2023/024181, "International Preliminary Report on Patentability", Dec. 12, 2024, 8 pages.

* cited by examiner

GRANTING PERMISSIONS AND ACCESSES TO DEVICES AND THIRD PARTIES

CROSS-REFERENCE TO RELATED APPLICATIONS

This application claims priority under 35 U.S.C. § 119(e) to U.S. Provisional Application No. 63/348,858, filed on Jun. 3, 2022. The contents of said application are hereby incorporated by reference in their entirety.

BACKGROUND

Advancements in cloud computing have allowed software applications to be tailored to each user's individual preferences and experiences. These users expect the ability to access any application from any location and maintain their individualized experience. To accommodate this expectation, our home, office, and traveling environments are populated with Internet-enabled devices that can be used to access and enjoy each of these software applications.

BRIEF SUMMARY

In some implementations, an owner can delegate the responsibility of providing a token for a guest to access one or more accessory devices at a rental property to a sharing platform, such as Airbnb® or Vrbo®. The sharing platform can further create a token that is co-terminus with the guest's reservation. In particular, a computing device can receive a request to delegate the responsibility for creating a token to access an accessory from an owner to the sharing platform. The computing device can then determine whether the accessory is eligible for delegation of the authority from the owner to the sharing platform. For example, the computing device can determine whether the owner owns the device and whether the owner hasn't previously delegated the responsibility to someone other than the sharing platform. Based on the determination, the computing device can request an intermediate certificate from the sharing platform, which can be associated with the eligible accessory. The computing device can then validate the sharing platform based on comparing the intermediate certificate and the root certificate. Assuming that the sharing platform is validated, the computing device can create a delegation file that identifies the approved delegation.

In some implementations, the computing device can initially validate the sharing platform based on comparing the issuing certificate authority listed on the root certificate with a list of trusted certificate authorities. Once the computing device receives a request to approve a delegation, the computing device can retrieve an intermediate certificate from the sharing platform. The computing device can compare the intermediate certificate to the root certificate to validate that the sharing platform receiving the delegation authority is the same sharing platform that provided the root certificate.

In some implementations, the computing can further store the delegation file. In this sense, the owner of a rental property does not have to request a delegation each time that a new guest reserves the property. The delegation file can include a delegation identifier that can be associated with an accessory(s) or property. Each time that a guest makes a reservation for the property, the sharing platform can access the delegation file and determine that it has permission to create a token for the guest.

Implementations offer the following advantages. The owner can delegate responsibility for creating a token to the sharing platform, which can relieve the owner of some hosting duties. The owner can further receive assurances that the computing device has verified the sharing platform and verified that the delegation is being transmitted to a valid sharing platform. The delegation to the sharing platform can further persist past a guest's reservation. Therefore, the sharing platform can continue to create a token for each guest who rents the property. This arrangement enhances the guest experience at the property and unburdens the owner from tedious responsibilities.

DETAILED DESCRIPTION

Figure 1:
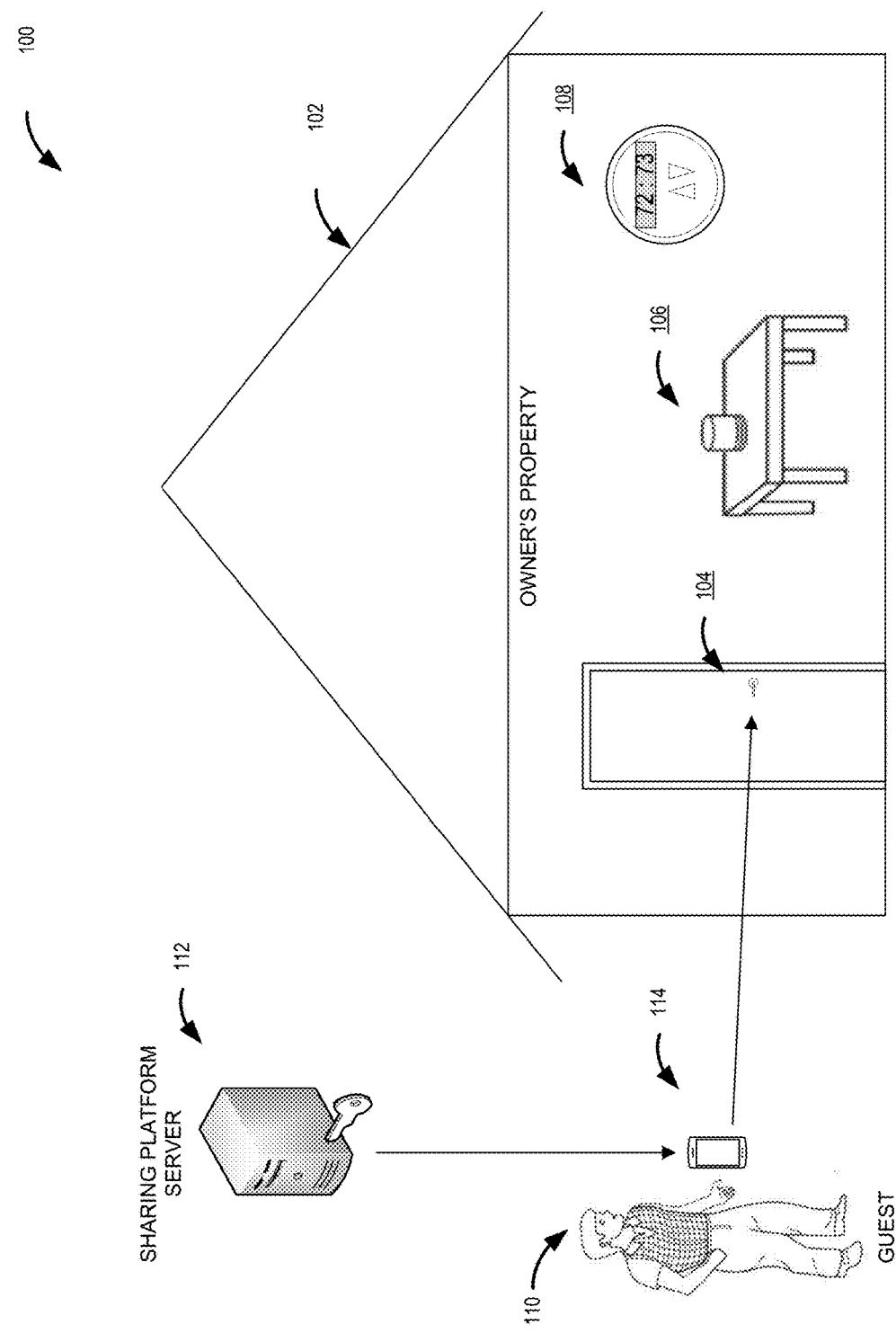
FIG. 1 is an illustration of an owner-guest environment with delegated token generation authority, in accordance with some embodiments.

In the following description, various examples will be described. For the purposes of explanation, specific configurations and details are set forth to provide a thorough understanding of the examples. However, it will also be apparent to one skilled in the art that the examples may be practiced without the specific details. Furthermore, well-known features may be omitted or simplified in order not to obscure the example being described.

The development and proliferation of sharing platforms have enabled owners to negotiate the use of their assets with members of the public. Experiences such as car services and hospitality that were once reserved for professional service providers can now be offered by individuals via sharing platforms such as Airbnb®, Vrbo®, and Turo®. Furthermore, advancements in consumer technology have enabled these same owners to offer new technology-based experiences to their guests. This new technology can be offered through devices that can be integrated throughout the owner's property. For example, the owner's house can be equipped with smart locks, smart thermostats, and other experience-enhancing accessories. A guest can enjoy each of these accessories to enhance their rental experience.

In most instances, both the owner and the guest use the sharing platform to offer and rent a property without much, if any, direct interaction with each other. Therefore, one issue for owners can be providing their guests with access to these experience-enhancing accessories while minimizing the owner's involvement. In many instances, the owner maintains control over experience-enhancing accessories, even while the guest is staying at the owner's property. This includes the ability to adjust the settings of the experience-enhancing accessories. As is normal, the guest may want to adjust one or more settings of the experience-enhancing accessories. However, the software executing on the device may only be responsive to the owner's device and therefore be unresponsive to any guest. Therefore, if a guest wants to adjust the accessory settings, the guest can contact the owner and have the owner remotely control the settings. For example, if an owner has a smart thermostat installed and has locked the thermostat to a specific temperature range, the guest may need to contact the owner to remotely control the thermostat each time that guest wants to change the temperature outside of the range. This is a tedious process and is not always practical based on the owner's availability. Using the example above, if the guest wants to adjust the temperature at 11:00 pm, the owner may be asleep and may not receive the message until the next morning. If the owner is unavailable and the guest cannot sleep due to the temperature, this can dim the guest's view of the rental experience. The guest may further leave a poor review for the owner on a sharing platform, which can result in decreased bookings for the owner.

Embodiments described herein address the above-described issues allowing an owner to delegate token generation responsibility to a third-party service, such as a sharing platform. An owner can use their user device, such as a smartphone or laptop, to request that a sharing platform assume the owner's responsibility for generating a token for one or more of the owner's accessories. The request can be processed via a client application, such as Apple Wallet®, executing on the user device. The client application can be associated with a software framework application for managing an environment, such as Apple's Home®. The client application can generate a prompt asking the owner for which accessories or property does the owner want to delegate token generation to the sharing platform. The client application can communicate the request for each selected device to an application server associated with the software framework, such as an Apple delegation server.

The delegation server can then communicate with a software framework server to determine whether the owner has the authority to delegate token generation authority to the sharing platform. The delegation server can request that the software framework server check the eligibility of the owner and request a challenge, where the challenge is a randomly generated number. The software framework server can verify that the owner is eligible to delegate responsibility and generate the challenge. For example, the software framework server can determine whether the owner has registered any of the selected accessories with the software framework. In the case of Apple Home®, the owner can have registered one or more of the experience-enhancing accessories to monitor and/or control the accessories via the Apple Home® application.

The delegation server can further validate the sharing platform as a legitimate sharing platform. The delegation server can previously have received a root certificate, such as a secured socket layer (SSL) root certificate from the sharing platform. The delegation server can validate the sharing platform by comparing the certifying authority (CA) of the root certificate to a list of trusted CAs.

The delegation server can negotiate directly with the sharing platform server to delegate the token generation authority from the owner to the sharing platform server. The responsibility can further be anchored to an asset, such as a rental house populated by accessories via an intermediate certificate. The intermediate certificate can be generated by the sharing platform and signed using a signature from the root certificate. The intermediate certificate can validate that the owner has delegated token generation authority as to accessories or property. Therefore, once the sharing platform server assumes responsibility, the delegation carries from guest to guest until such time that the owner revokes the delegation or delists the property from the sharing platform.

The guest can use the sharing platform (e.g., Airbnb® website or client application) to reserve the owner's property. Based on the reservation, the sharing platform server can provision resources to generate a token for one or more accessories at the owner's property. The sharing platform server can further transmit the token to an application executing on the guest's user device (e.g., Apple Wallet® executing on the guest's smartphone). The application can store the token for use by the guest during their stay at the owner's property.

During the guest's stay at their owner's property, the guest can access the application through their user device, which can transmit the token to a mediating device that can validate the token. The device can receive the token, validate the token, and allow the guest to assume control of one or more accessories, pursuant to any owner-imposed restrictions included in the token. The token can be co-terminus with the guest's reservation, and thereby expire when the reservation is over.

FIG. 1 is an illustration of owner-guest environment 100, in accordance with some embodiments. An owner (not shown) can own a house 102 and make it available through a sharing platform, such as Airbnb® or Vrbo®. The house 102 can include one or more accessories, including a first accessory 104, a device 106, such as a resident device, and a second accessory 108. Each accessory can be integrated into the owner-guest environment 100 and enhance a guest experience. The first accessory 104 can be, for example, a smart lock; and the second accessory 108 can be, for example, a smart thermostat. Each of the accessories can be owned by the owner and include software that restricts access to the accessory. It should be appreciated that number and nature of the accessories found in the house 102 are illustrative and in practice, an asset can include any number of accessories of any type. A guest 110 can reserve the house 102 through the sharing platform. For example, the guest 110 can access the sharing platform and browse available properties and select the owner's house 102 to reserve.

The owner can delegate the authority to generate a token to the sharing platform. Based on the delegation, a sharing platform server 112 can generate a token for one or more accessories and transmit the token to the guest's user device 114. The guest 110 can use their user device 114 to present the token to a device 106 (e.g., Apple HomePod®) for validating the token, and accessing the one or more accessories. The device 106 can validate the signature of the token and determine whether the guest has been granted access to one or more accessories or not. It is conceivable that the owner does not delegate the authority for the sharing platform to grant access to all accessories to the guest 110. Therefore, the delegation by the owner can either be accessory-specific or property-specific.

The user device 114, such as a smartphone, can include an application, such as apple Wallet®, that can store a token for accessing the accessory. The application can receive the token from a sharing platform server 112 based on the guest's reservation of the house 102.

The sharing platform server 112 can include one or more interconnected computing devices implementing one or more sharing platform applications or services. For example, the sharing platform server 112 can store and generate a token. The computing devices included in the sharing platform server 112 can be in one or more data center environments.

Returning to FIG. 1, the house 102 can be secured by a first accessory 104 (e.g., a smart lock) that requires a cryptographic communication to lock or unlock. The owner can have the sharing platform server 112 assume responsibility for generating the cryptographic communication (e.g., pass) for the guest to access the first accessory 104. The guest can reserve the house 102 via the sharing platform server 112, which in turn receives the reservation details, such as guest identity, reservation start date, and length of stay. Based on the reservation, the sharing platform server 112 can generate a cryptographic communication for the guest 110 to lock or unlock the first accessory 104. The sharing platform server 112 can further transmit the cryptographic communication to an application executing on the guest's user device 114. For example, the sharing platform server 112 can transmit the cryptographic communication as part of a message to the guest 110 confirming the reservation. It should be appreciated that conventionally, the guest 110 would access the first accessory 104 by directly receiving a code from the owner. The guest 110 could then manually enter the code into the first accessory 104. In some instances, the guest 110 may further need to have downloaded the first accessory 104 manufacturer's application on their user device 114. The guest 110 would then open the manufacturer's application, and the manufacturer application and transmit the code provided by the owner to the first accessory 104. As described above, this process is tedious as the owner has to continuously create new passwords each time that a new guest reserves the house 102.

In some instances, the first accessory 104 and the user device 114 can be equipped with short-range radio technology, such as near field communication (NFC) technology. The first accessory 104 and user device 114 can detect each other based on their proximity. The detection can be based on coupling the first accessory 104 and the user device 114 via an electromagnetic field generated by the user device 114. The user device 114 can further open a secure communication channel with the first accessory 104 based on the detection. The user device 114 can further engage in a cryptographic flow, in which the first accessory 104 validates the signature of data sent by the user device 114 for authenticity to operate the first accessory 104. In some embodiments, the data transmitted by the user device 114 can be a pass received from the sharing platform server 112. The owner can have further authorized the sharing platform server 112 to generate and transmit the pass to the user device 114. Based on the validation, the first accessory 104 can allow the guest 110 to control the first accessory 104 via the user device 114. Communication between the first accessory 104 and the user device 114 via the NFC technology is discussed with more detail with respect to FIG. 4.

Figure 2:
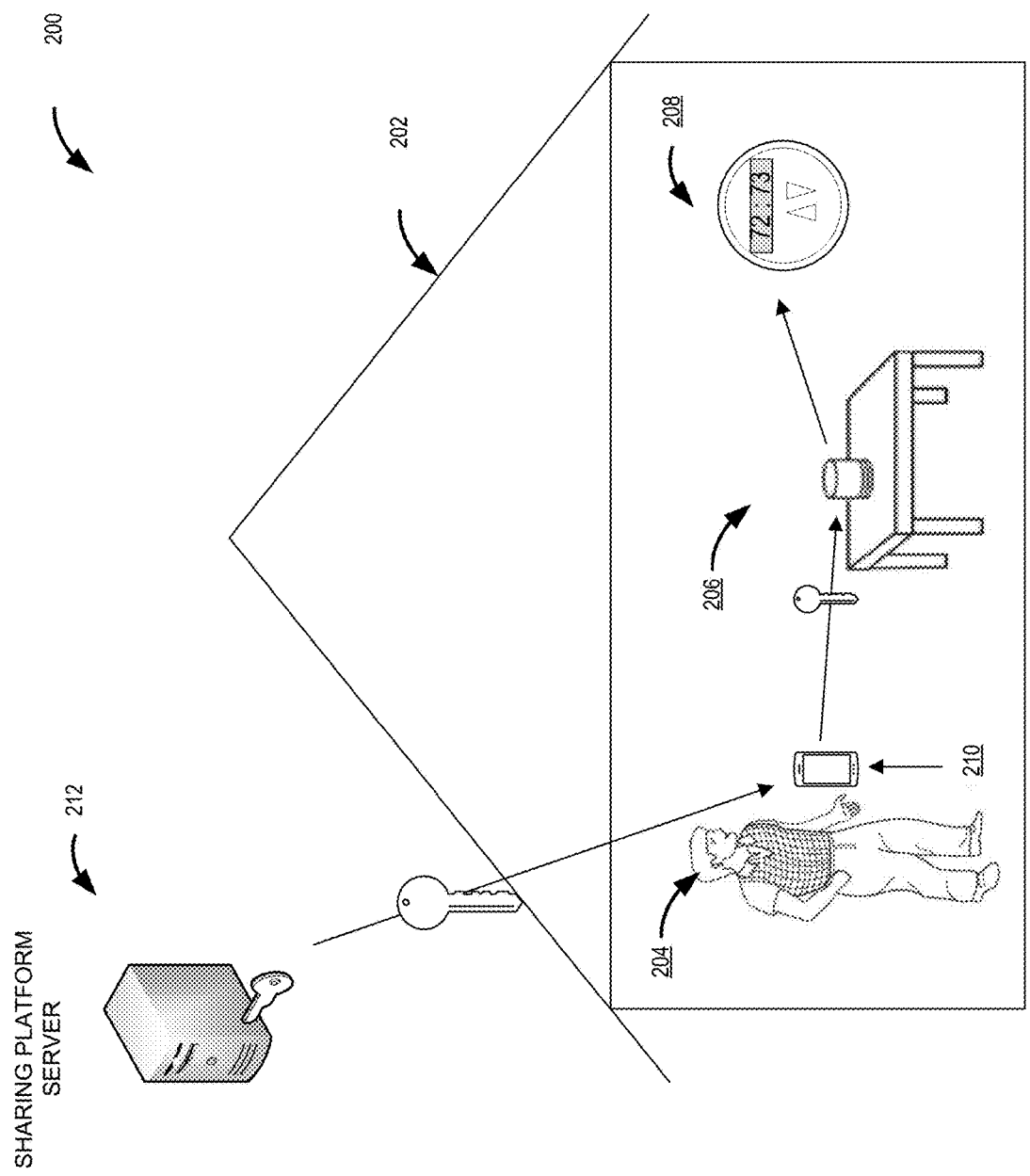
FIG. 2 is an illustration of an owner-guest environment with delegated token generation authority, in accordance with some embodiments.

FIG. 2 is an illustration of an owner-guest environment 200, in accordance with some embodiments. As described above, an owner can own a house 202 and make the house 202 available to a guest 204 through a property sharing platform. As illustrated, the house 202 can include a device 206 and one or more accessories 208. FIG. 2 differs from FIG. 1 in that the guest 204 has entered the house 202. The device 206 can be a resident device (e.g., Apple HomePod®) that can be a computing device that is designed to execute the software framework, including software that is configurable by the software framework, and operable to execute the software framework. For example, if the software framework is Apple Home®, the device can be Apple Homepod®. The device 206 can mediate between the user device 210 and the one or more accessories 208.

It should be appreciated that the device 206 can be a smart speaker, and one of the one or more accessories 208 can be a smart thermostat for illustration purposes, and each could embody a different form. Therefore, the functionality described below with respect to a smart speaker or smart thermostat can apply to different embodiments. For example, the device 206 can be a laptop, and one of the one or more accessories 208 can be a smart fan, where the laptop can include the functionality of the smart speaker and the smart thermostat can be replaced with a smart fan, where instead of adjusting a temperature, a rotational speed of the fan can be adjusted.

The guest 204 can have a user device 210, such as a smartphone, which the guest 204 can use to present a token to access one or more accessories in the house 202. The user device 210 can be the same user device that the guest 204 used to unlock a smart lock to enter the house 202. The user device 210 can include an application that can receive a token from a sharing platform server 212 and store the token accessing the one or more accessories via the device 206. The application can receive the token from the sharing platform server 212 in response to the guest 204 reserving the house 202.

The owner of the house 202 can have previously requested that the sharing platform server 212 assume responsibility for generating a token for one or more accessories. Based on the request, the sharing platform server 212 can generate a respective token for accessing the one or more accessories 208. The sharing platform server 212 can transmit the token to the application on the user device 210. The device 206 can receive the token from user device 210 to validate the token. The device 206 can communicate with the one or more accessories 208 to grant access to the guest based on the validated token.

Returning to FIG. 2, the guest 204 can have reserved the house 202 from the owner and using the sharing platform server 212. The house 202 can include a device 206 and one or more accessories 208. The device 206 and the one or more accessories 208 can be configured such that communication from the user device 210 to the one or more accessories 208 is mediated by the device 206. Therefore, communication to the one or more accessories 208 by a user device, such as the user device 210 is routed through the device 206, which transmits the communication from the user device 210 to the one or more accessories 208. For example, the device 206, the one or more accessories 208, and the user device 210 can each include an instance of a software framework for managing accessories, such as Apple Home® or Google Home®. The software framework can include a transmission protocol that routes all communication from the user device 201 to the one or more accessories 208 through the device 206.

The sharing platform server 212 can generate a token for one or more accessories (e.g., including a smart thermostat). The sharing platform server 212 can further transmit the token to an application executing on the user device 210. The application can be an application for storing passwords and be different than the software framework. For example, the application can be Apple Wallet® or Google Pay®. The guest 204 can receive a token to operate one or more accessories 208 from the sharing platform server 212 via their user device 210. The guest 204 can use the application on the user device 210 to present the token to the device 206, which can validate the token. Based on the validation, the device 206 can communicate with the one or more accessories to allow access to the guest 204.

The device 206, the one or more accessories 208, and the user device 210 can be connected to a network, such as a local area network (LAN) or a WiFi network associated with the house 202. Each device can further be associated with a software framework. For example, the user device 210 can include an instance of the software framework. The user device 210 can further detect the device 206 and the one or more accessories 208 based on being connected to the same network. Furthermore, the owner can have permitted another instance of a software framework to manage both the device 206 and the accessory (e.g., smart thermostat). For example, the guest 204 has an instance of Apple Home® on the user device 210, and the owner has registered the device 206 and the one or more accessories 208 with Apple Home®.

In some instances, the guest 204 can control the one or more accessories 208 via the user device 210, and in other instances, the guest 204 can control the accessory through manual inputs. The token can further be configured to expire after a time frame to prevent the guest 110 from accessing the smart lock after the reservation has expired.

Referring to FIG. 2, the guest 204 can enter the house 202, which includes a device 206 and one or more accessories 208. An accessory of the one or more accessories 208 can be, for example, a smart thermostat, a smart fan, or a smart garage door opener. As illustrated, the one or more accessories 208 in the house 202 can be a smart thermostat. As the guest's user device 210 connects to the house's network, the device 206 can detect the user device 210. The user device 210 can transmit the token to the device 206. The device 206 can validate the token to enforce access control to the one or more accessories 208. The guest 204 can control each of one or more accessories 208 using their user device 210, or through manual inputs.

Figure 3:
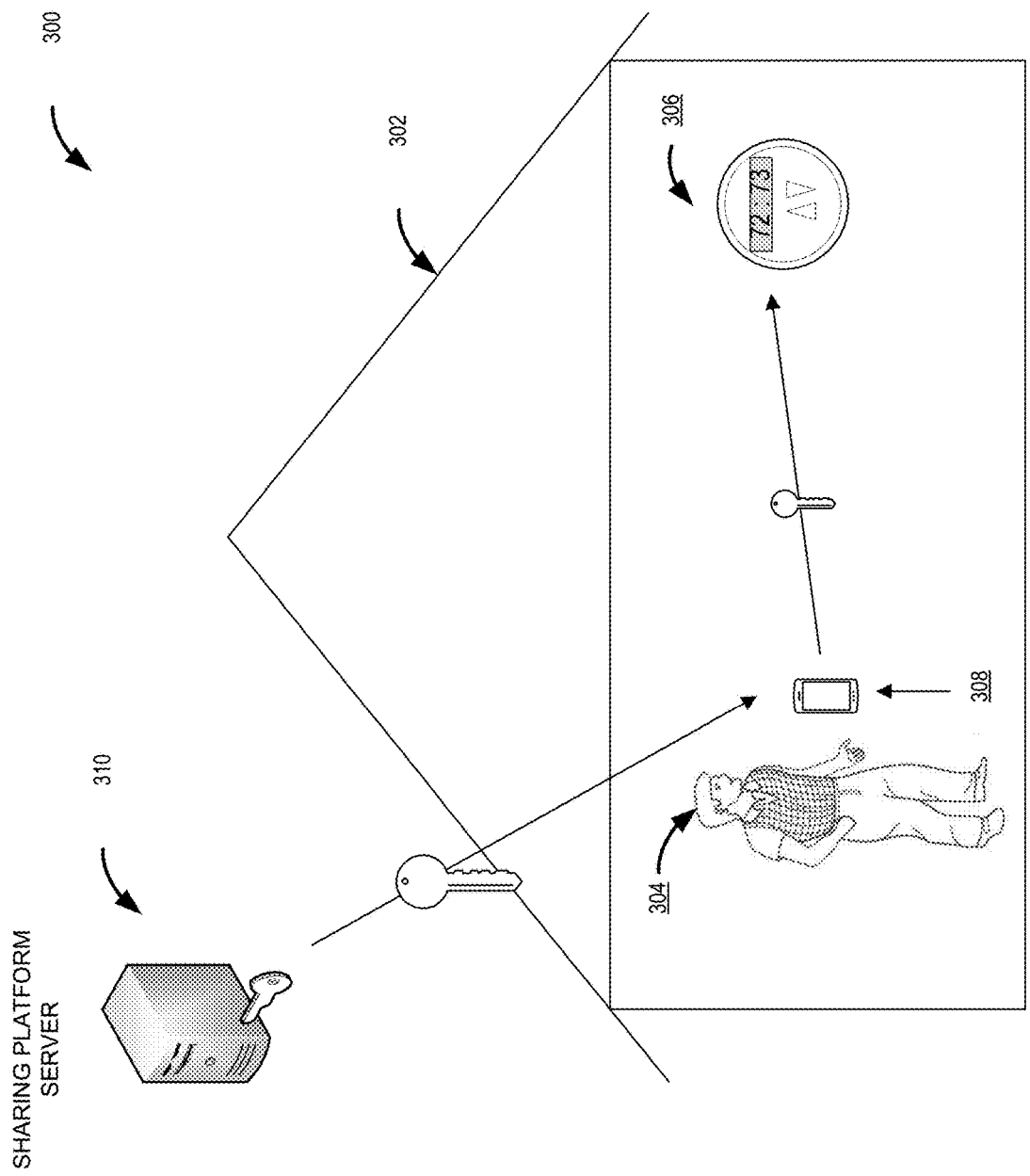
FIG. 3 is an illustration of an owner-guest environment with delegated token generation authority, in accordance with some embodiments.

FIG. 3 is an illustration of an owner-guest environment 300, in accordance with some embodiments. As described above, an owner can own a house 302 and make the house 302 available to a guest 304 through a sharing platform. As illustrated, the house 302 can include one or more accessories 306, such as a smart thermostat, a smart garage door, or a smart fan. As illustrated, the one or more accessories 306 can be a smart thermostat. FIG. 3 differs from FIG. 2 in that the house 302 does not include a mediating device (e.g., device 206), and consequently, communication between user device 308 and the one or more accessories 306 is not mediated by a device.

The guest 304 can have a user device 308, such as a smartphone, which the guest 304 can use to access the one or more accessories 306. The user device 308 can be the same user device that the guest 304 used to access a lock to enter the house 302. The user device 308 can include an application that can store a token for accessing the one or more accessories 306. The application can receive the token from a sharing platform server 310 in response to the guest 304 reserving the house 302 through the sharing platform server 310.

The guest 304 can have reserved the house 302 from the owner using the sharing platform server 310. The owner can have requested that the sharing platform server 310 assume responsibility for granting the guest 304 access to the one or more accessories 306. Based on the reservation of the house 302 by the guest 304, the sharing platform server 310 can generate a token for the guest 304 to access the one or more accessories 306 (e.g., smart thermostat). The sharing platform server 310 can further transmit the token to the user device 308.

The guest 304 can use the token stored on their user device 308 to access the one or more accessories 306. As illustrated, the house 302 does not include a device for routing communication to the one or more accessories 306, and therefore the user device 308 can communicate directly with the one or more accessories 306. The user device 308 can detect the one or more accessories 306. For example, the user device 308 and the one or more accessories 306 can be connected to the same network. The user device 308 and the one or more accessories 306 can further communicate. The communication can be, for example, a direct communication such as via a blue tooth enable transmission protocol. The communication can also be, for example, via an internet connection. For example, the guest 304 can download an application associated with the one or more accessories 306 and communicate via a server associated with the smart thermostat, assuming the one or more accessories 306 can communicate via the internet.

Referring to FIG. 3, the guest 304 can be in the house 302, which includes the one or more accessories 306, such as a smart thermostat. The sharing platform server 310 can transmit a token to the user device 308. The user device 308 can transmit the token to the one or more accessories 306. The one or more accessories 306 can validate the token received from the user device 308. The guest 304 can control the one or more accessories 306 using their user device 308, or through manual inputs based on the validation.

Figure 4:
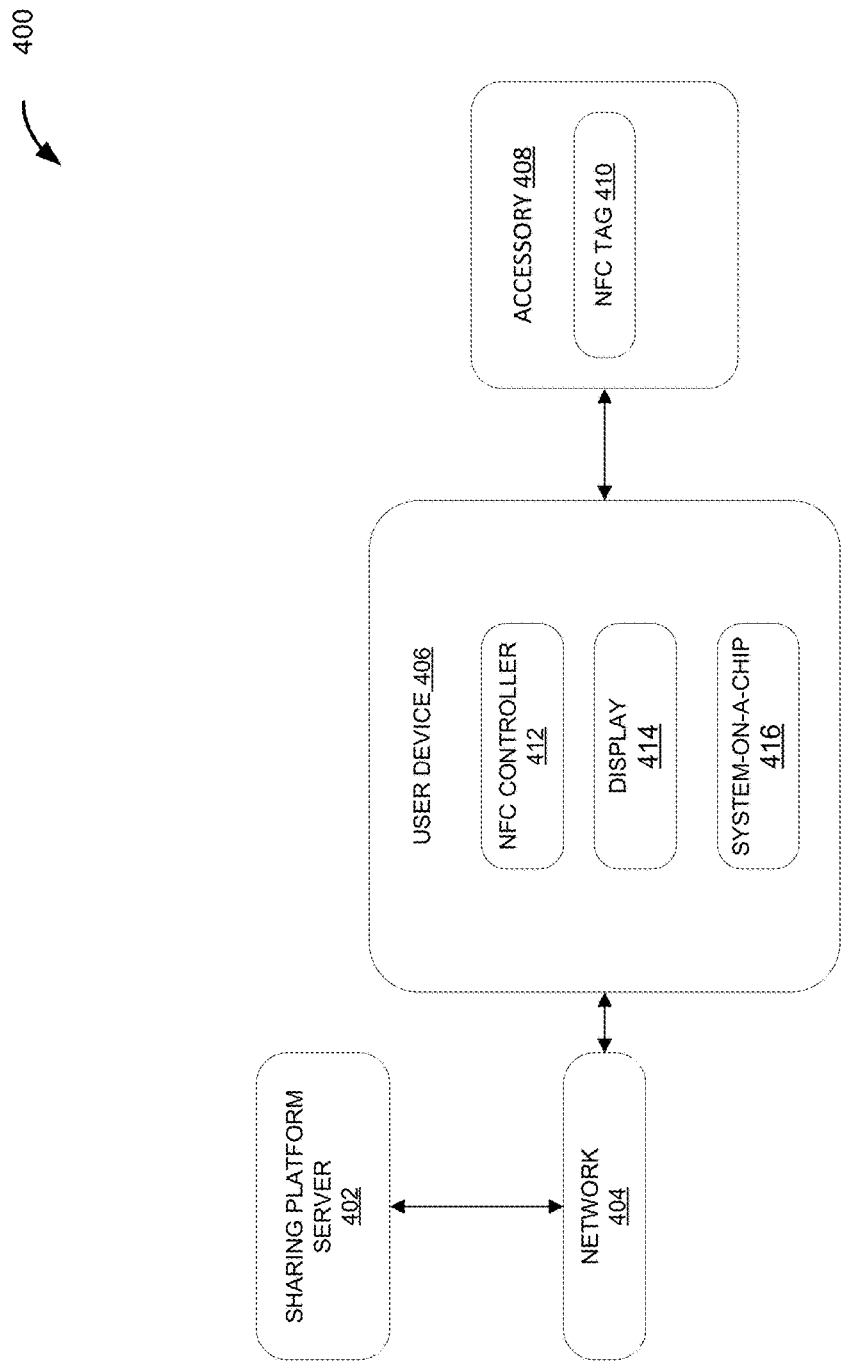
FIG. 4 is an illustration of a near field communication (NFC) system, in accordance with some embodiments.

FIG. 4 is an illustration of an NFC communication 400, according to some embodiments. NFC is a short-range radio technology standard for communication between two devices that are in close proximity (e.g., three inches). A sharing platform server 402 can be connected to a network 404 and communicate with a user device 406 via the network 404. The network 404 can be, for example, the internet and the user device 406 can be a smartphone. The user device 406 can communicate with an accessory 408, which is equipped with an NFC tag 410. The accessory 408 can be, for example, a smart lock.

To enable NFC technology, the user device 406 can include an NFC controller 412, a display 414, and a System-on-a-Chip (SoC) 416. The NFC controller 412 can cause an emitter of the SoC to emit an electromagnetic field. For example, the NFC controller 412 can cause an alternating current to be transmitted through a primary coil (e.g., the emitter) of the SoC 416. As a result, the coiled wire can emit an electromagnetic field. Conversely, the NFC tag 410 can include a secondary coil in which an alternating current is induced by the electromagnetic field created by the user device 406. In addition to a secondary coil, NFC tag 410 can include a small amount of memory and control instructions. Activating the NFC tag can cause the accessory 408 to emit a response to the user device 406. The user device 406 can receive the response, and based on the response, the user device 406 can open a secure channel with the accessory 408. The user device can transmit a cryptographic communication to the accessory 408 over the secure channel and the accessory 408 can grant access to a guest based on the cryptographic communication.

The cryptographic communication can be generated by the sharing platform server 402 based on a delegation by an owner. The guest can have used the sharing platform to reserve the owner's property. Based on the reservation, the sharing platform server 402 can generate and transmit a cryptographic communication for the guest to temporarily use the owner's smart lock.

Figure 5:
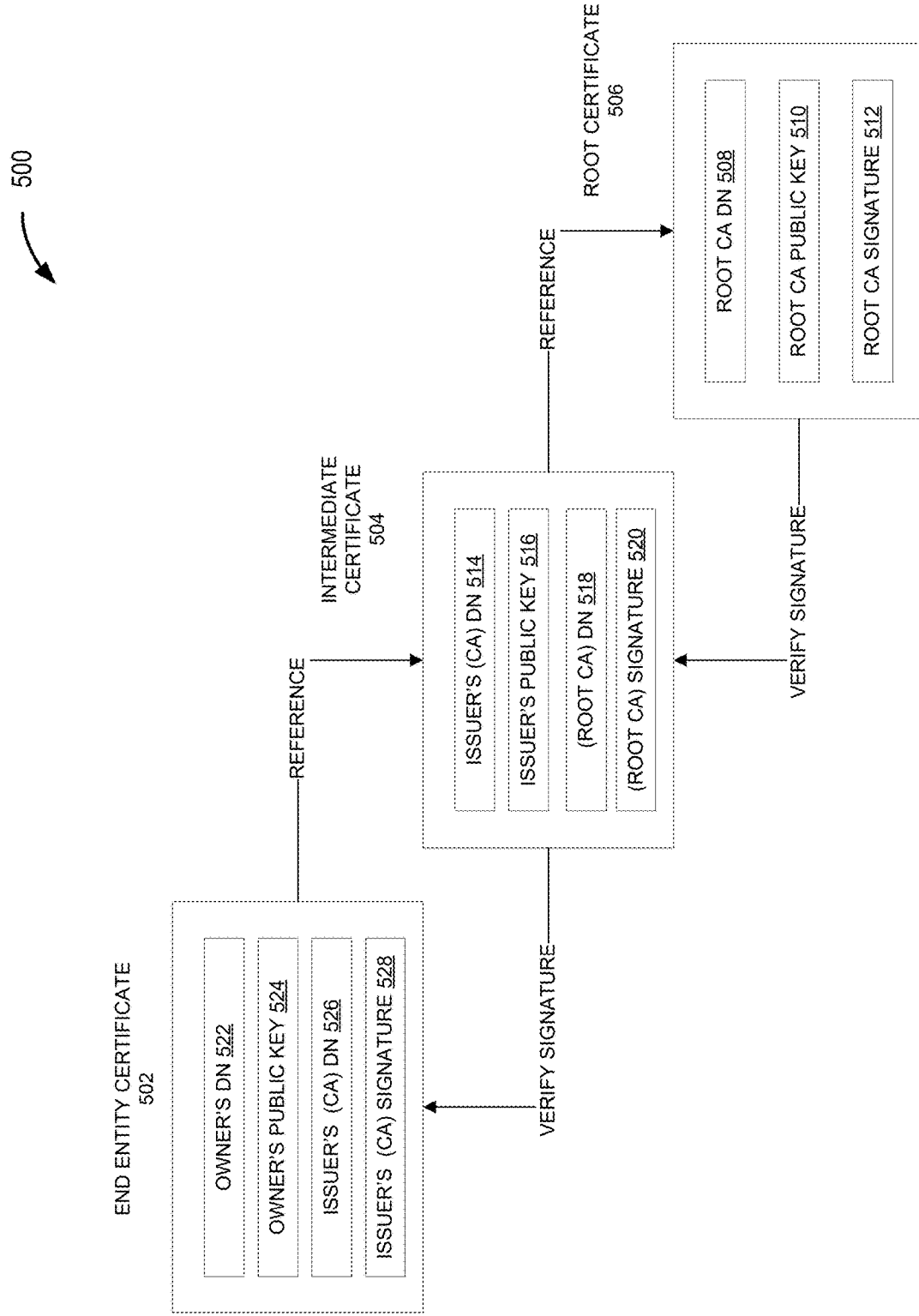
FIG. 5 is an illustration of a certificate chain, in accordance with some embodiments.

FIG. 5 is an illustration of a certificate chain 500 which includes an end entity certificate 502 mapped to an intermediate certificate 504, and the intermediate certificate 504 is mapped to a root certificate 506. The certificate chain 500 enables trust between certificate authorities (CAs) of a public key infrastructure (PKI). This trust is based on a set of hierarchical rules that govern interactions between a root CA, an intermediate CA, and any issued certificates, such as SSL certificates. The root certificate 506 is issued by a root (CA), such as GolbalSign®. Additionally, a root certificate 506 that is signed by a known CA can establish trust between two or more devices.

As illustrated, the root certificate 506 includes a root CA domain name (DN) 508, a root CA public key 510, and a root CA signature 512. The intermediate certificate 504 includes an issuer's DN 514, where the issuer is the CA for the intermediate certificate 504, such as a sharing platform. The intermediate certificate further includes an issuer's public key 516, the root CA's DN 518, which can be the same as the root CA's DN 508 of the root certificate 506, and the root CA's signature 520, which can be the same as the root CA's signature 512 of the root certificate. The root CA's DN 518 and the root CA's signature help establish the chain between the intermediate certificate 504 and the root certificate 506. The end entity certificate 502 can further include an owner's domain name (DN) 522, an owner's public key 524, and an issuer's DN 526, which can be the same as the issuer's DN 514 of the intermediate certificate 504. The end entity certificate 502 can further include an issuer's signature 528. The issuer's DN 526 helps establish the chain between the end entity certificate 502 and the intermediate certificate 504.

An intermediate certificate 504 is signed by an intermediate CA for use a domain specific certificate. In practice, the intermediate CA uses a certificate signed by the root CA. The intermediate CA can be, for example, the sharing platform. The intermediate certificate can be used to generate a token for one or more accessories in a rental property and owned by an owner, or the intermediate certificate can be used to generate a token for all accessories in the rental property. For example, the intermediate certificate can be used to validate a request from a sharing platform to generate a token for one or more devices owned by the owner. The intermediate CA derives its authority from the root CA, and is lower hierarchically than the root CA.

The root CA uses a public key certificate that are identifiable to the root CA. Each web browser includes a list trusted root CAs, and therefore when a certificate is received, the web browser can validate the CA. Whether a certificate is an intermediate certificate 504 or a root certificate 506, the browser or end entity verifies whether the certificate includes the root CA's signature, and that the root CA is a trusted CA. If either the certificate does not include the root CA's signature or the root CA is not included in the list of trusted CA, the certificate will fail. In some instances, the certificate chain 500 includes more than one intermediate certificate, for example, the sharing platform may contract with a third party. In any event, the browser or end entity will follow the certificate chain back until a root CA is identified. The browser or end entity will then check the identified root CA with the list of trusted root CAs.

A software framework server can initiate an SSL connection to an end entity that has a certificate signed by an intermediate CA. In some instances, the end entity can be a server of the sharing platform, and the intermediate certificate can be accessory specific and generated specifically for one device or a set of accessories owned by the owner, or in some instances, a property specific certificate and can be generated for all accessories in the property. The software framework server can follow the signatures of the mapped certificates of a certificate chain until it detects the root certificate 506. The software framework server can then verify the CA that issued the root certificate 506 based on comparing the CA identity to a list of trusted CAs.

Based on validating the CA, the intermediate certificate 504, and the root certificate 506, the software framework server can notify a delegation server that sharing platform server has been validated to receive a delegation of a generation of a token. Based further on the validation, the delegation server can open a secure channel with the sharing platform server and complete delegation of generation of the token to the sharing platform server.

Figure 6:
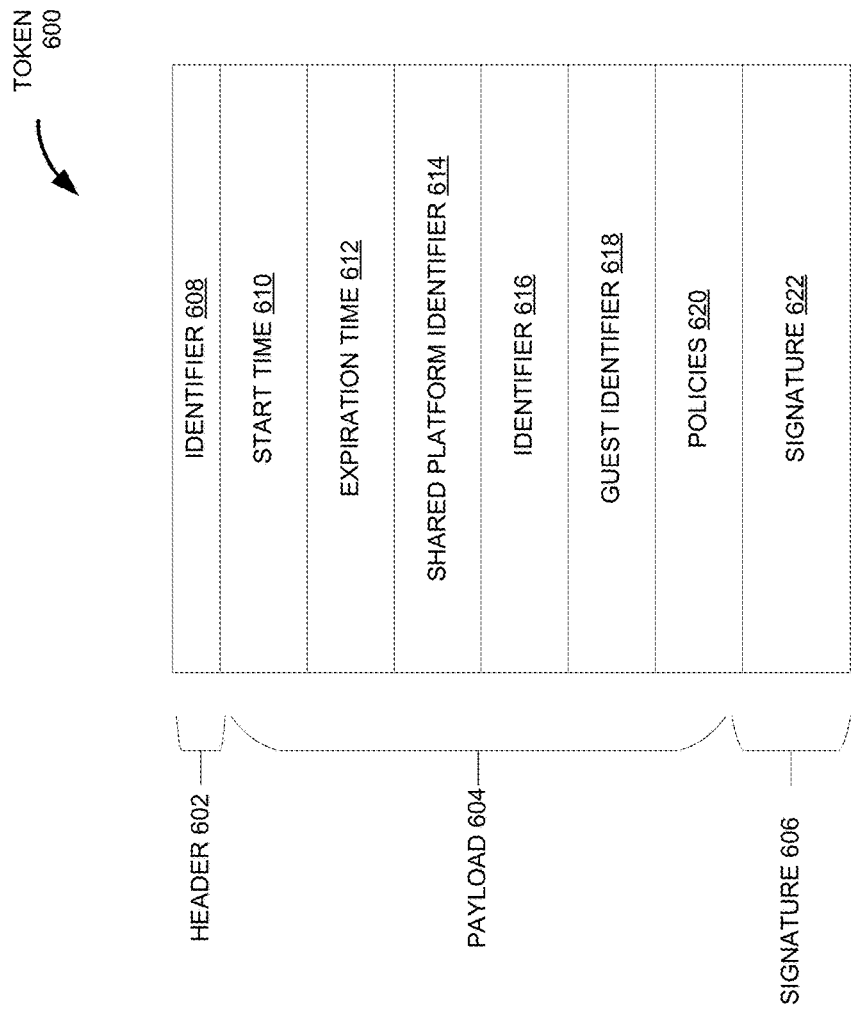
FIG. 6 is an illustration of a token, in accordance with some embodiments.

FIG. 6 is an illustration of a token 600. The token 600 includes data created by a sharing platform server and used to permit a guest to access an accessory. In order to create the token 600 for a guest, an owner can delegate the responsibility to a sharing platform. After the owner delegates the responsibility, a guest can make a reservation to temporarily use the owner's property through the sharing platform, such as Vrbo R. The sharing platform can receive the guest's reservation details and create the token 600 based on the delegation and the reservation.

The token 600 can include a header 602 for identification, a payload 604 including data describing the terms of the token 600, and a signature 606 for verifying that the token originated from a trusted source.

The header 602 can include an identifier 608 for the token. The payload 604 can include one or more of the illustrated items. The payload 604 can include a start time for when a guest is permitted access to one or more accessories and an expiration time 612 for when the guest loses access to the one or more accessories. The sharing platform server can determine the start time 610 and the expiration time 612 based on the reservation information provided by the guest.

The payload 604 can include a sharing platform identifier 616, which can be a unique identifier for the sharing platform. For example, a first sharing platform can be associated be a first sharing platform identifier, and a second sharing platform can be associated with a second sharing platform identifier. The sharing platform identifier can be provided by the sharing platform server. The payload 604 can further include a sharing platform identifier 616, which can be an identifier unique to an accessory or set of accessories. The sharing platform identifier 616 can be provided by the owner during the delegation request process. The payload 604 can further include a guest identifier 618, which can be an identifier unique to the guest. The sharing platform server can receive the guest identifier 618 through the reservation information provided by the guest. The payload 604 can further include policies 620, which can be policies governing the use of the accessory. For example, the policies can include accessory-specific restrictions on the usage of the accessory. For example, if the accessory is smart thermostat, the policies can govern a minimum and maximum allowable temperature.

The signature 622 can include a signature for verifying the authenticity of the token. For example, the accessory can receive a public key from the sharing platform server. The sharing platform server can sign the token 600 using a private key. The accessory can use the public key to decrypt the token. If, for example, the public key does not decrypt the token, the accessory can assume that the token originated from or was modified by an unauthorized entity.

Figure 7:
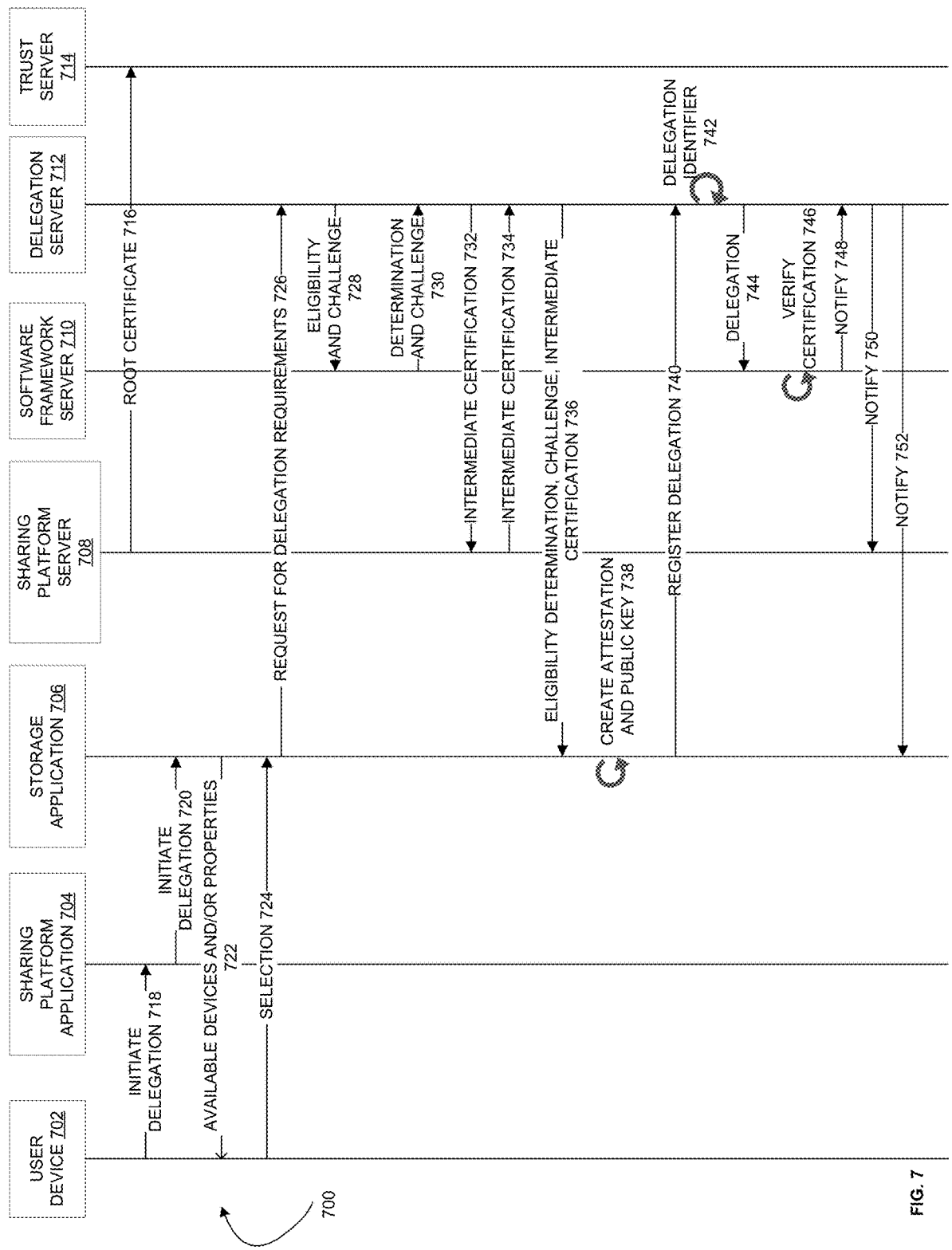
FIG. 7 is a signaling diagram for a delegation process, in accordance with some embodiments.

FIG. 7 is signaling diagram 700 for a user to delegate access authorization to a sharing platform, in accordance with some embodiments. While the operations of processes 700, 800, 900, 1000, and 1100 are described as being performed by generic computers, it should be understood that any suitable device (e.g., a user device, a server device) may be used to perform one or more operations of these processes. Processes 700, 800, 900, 1000, and 1100 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At 716, the sharing platform server 708 can transmit a root certificate to the trust server 714. In some instances, the sharing platform server 708 can transmit the root certificate to trust server 714 via a business register server (not shown). The root certificate can be a digital certificate file that is issued by a certifying authority (CA). The root certificate can be used to validate that the sharing platform is who it claims to be. The root certificate can include the CA's name, a CA's public key, and a CA's signature. The trust server 714 can be a computing device server associated with the software framework. For example, if the software framework application is Home®, the trust server 714 can be an Apple server for validating trusted devices and sources. The trust server 714 can validate the sharing platform server 708 based on the root certificate.

At 718, the user, such as an owner, can use a user device 702 to initiate a delegation process. For example, the user can use their device to access a sharing platform application 704, such as Airbnb mobile application, and initiate a delegation process. For example, the sharing platform application can present a prompt, via the user device 702, asking whether the user wants to initiate the delegation process. The user can affirmatively respond to the prompt to initiate the delegation process. In some instances, the user does not have the sharing platform application downloaded to the user device 702, and can use their device to access a web browser to search for and reach a sharing platform website to initiate the delegation process.

At 720, the sharing platform application 704 can transmit a message to a storage application 706 to initiate the delegation process. The storage application 706 can be, for example, an application that enables the user to store certificates, coupons, tickets, etc., such as Apple Wallet® or Google Pay®. The sharing platform application 704 can further identify each property owned by the owner and listed via the sharing platform.

At 722, the storage application 706 can present via the user device 702 all of the available properties for which the user can delegate access authority. The presentation can include individual devices or individual properties that include multiple devices. The presentation can be displayed on a display of the user device.

At 724, the user device 702 transmit the selected properties to the storage application 706.

At 726, the storage application 706 can transmit a request to identify delegation requirements for generating a token to the delegation server 712. The delegation server 712 can be a computing device server associated with the software framework. For example, if the software framework application is Home®, the delegation server 712 can be an Apple server.

At 728, the delegation server can transmit a request to determine eligibility for delegating authority to generate a token and a challenge.

At 730, the software framework server 710 can return a determination of eligibility and a challenge. The determination of eligibility can be a determination as to whether the owner has any devices or accessories at the selected properties. The determination can be based, for example, on whether the owner has registered any device with the software framework. The challenge can be a randomly generated number, such as a 16-bit number.

At 732, the delegation server 712 can request an intermediate certificate from the sharing platform server 708. The intermediate certificate can be generated by the sharing platform server 708. The intermediate certificate can include the certificate issuer's name (e.g., the sharing platform), the certificate issuers's public key, the root CA's name, and the root CA's signature.

At 734, the sharing platform server 708 can return the intermediate certificate to the delegation server based on the request. The intermediate certificate can be specific for a specific accessory(s) or property. For example, if the user has asked to delegate access authority with respect to the smart lock, the intermediate certificate can be specific to the smart lock. The root certificate can further be used to verify that the intermediate certificate was received from the sharing platform server 708.

At 736, the delegation server 712 can return the challenge, delegation eligibility determination, and the intermediate certificate to the storage application 706.

At 738, the storage application 706 can create a key attestation, which provides the ability to validate the user's identity and eligibility to delegate access authority. The storage application 706 can further create a new public key.

At 740, the storage application 706 can register the delegation of access authority with the delegation server 712.

At 742, the delegation server 712 can create a delegation identifier in response to the registration.

At 744, the delegation server can map the delegation identifier to a user identifier, to a sharing platform identifier, and to a device identifier in the software framework. If the user has delegated access authority to all devices in a property, the mapping can be from the delegation identifier to the user identifier to the sharing platform identifier to a property identifier that maps to each device identifier at the property. The delegation server can further transmit the user attestation and the intermediate certificate to the software framework.

At 746, the software framework server 710 can retrieve the root certificate from the trust server 714.

At 748, the software framework server 710 can verify the intermediate certificate using the root certificate. For example, the software framework server can verify that the intermediate certificate has been signed by the root certificate and that the CA identifying information in the intermediate certificate matches the CA identity information in the root certificate.

At 750, the software framework server 710 can notify the delegation server 712 that the delegation creation has been completed.

At 752, delegation server can notify the sharing platform server that the delegation request has been completed. The delegation server can further provide the delegation identifier to the sharing platform server.

At 754, the delegation server 712 can notify the storage application that the delegation process is complete.

Figure 8:
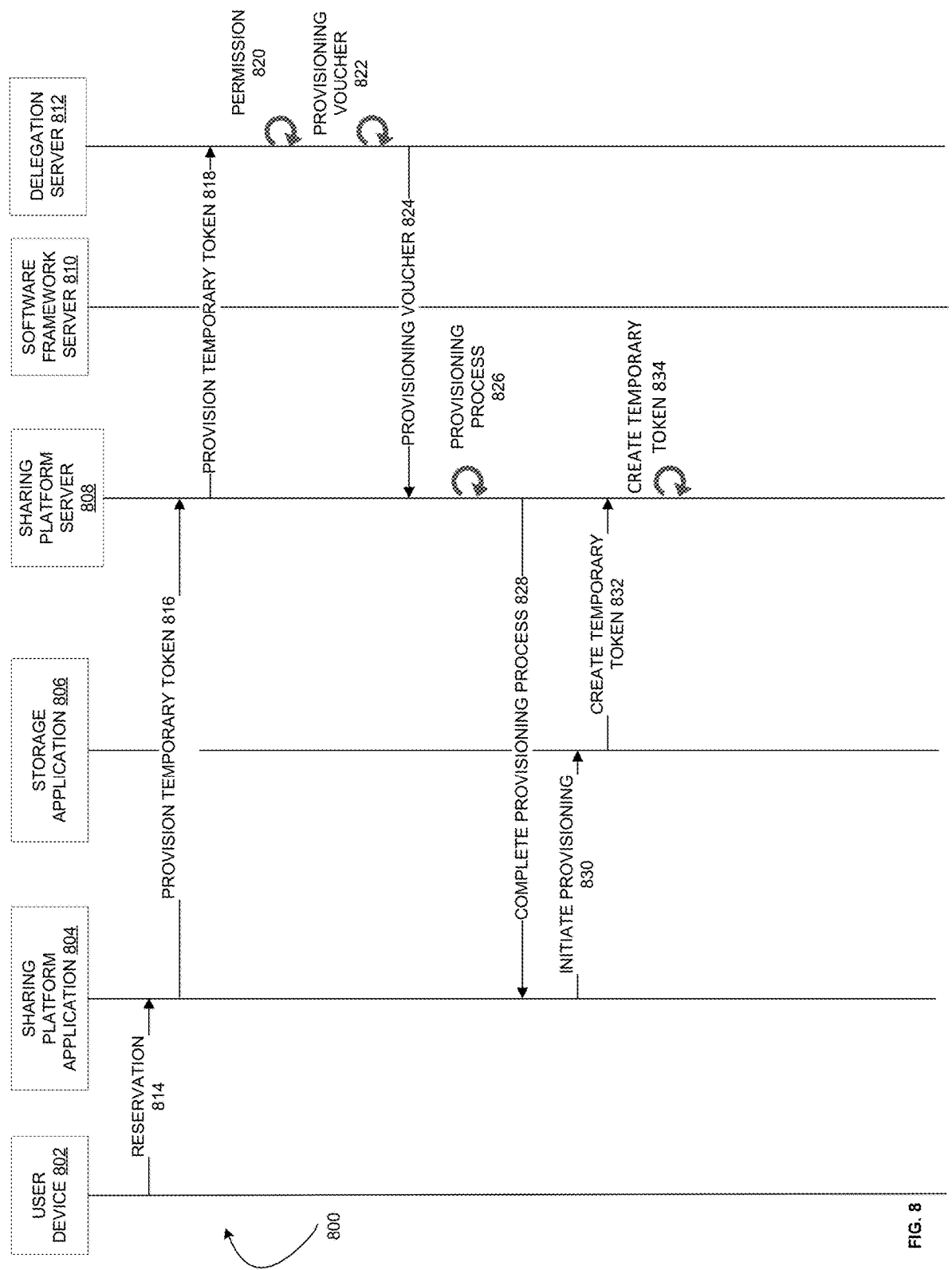
FIG. 8 is a signaling diagram for a provisioning process, in accordance with some embodiments.

FIG. 8 is signaling diagram 800 for key generation for a sharing platform, in accordance with some embodiments. At 814, a guest can use a guest device 802, such as a smartphone, to make a reservation for an owner's property through the sharing platform application 806.

At 816, the sharing platform application 804 can transmit a request for provisioning a token to the sharing platform server 808.

At 818, the sharing platform server 808 can forward the request for provisioning the token to the delegation server 812. The sharing platform server 808 can further provide the delegation identifier based on the owner and the guest's reservation data that has been signed using the intermediate certificate.

At 820, the delegation server 812 can send and obtain permission from the owner to approve the reservation. For example, the owner can manually input an approval on their user device (not shown). The user device can receive the approval input and transmit the approval to the delegation server 812. Steps 818 and 820 can be based on an owner's preference. For example, the owner can be provided a choice of personally approving each reservation, or allowing the sharing platform server 808 to approve a reservation without input from the owner.

At 822, the delegation server 812 can create a provisioning voucher. The provisioning voucher can include instructions for generating a token and loading the token onto a guest user device. In particular, the guest can have a storage application on their user device. The storage application can be an instance of the same storage application on the owner's device. The provisioning voucher can include instructions for generating the token, and instructions for loading the token in the storage application.

At 824, the delegation server 812 can transmit the provisioning voucher to the sharing platform server 808.

At 826, the sharing platform server 808 can continue the provisioning process, including inserting a token template identifier, and storing provisioning information in memory.

At 828, the sharing platform server 808 can transmit a message to the sharing platform application 804 to complete the provisioning process.

At 830, the sharing platform application 804 can transmit a request to the storage application to initiate the provisioning. It should be appreciated that the storage application 706 of FIG. 7 is an application executing of the owner's user device 702. The storage application 806 executes on the guest's user device 802.

At 832, the storage application 806 can send a message to the sharing platform server 808 to create the token.

At 834, the sharing platform server 808 can create the token.

Figure 9:
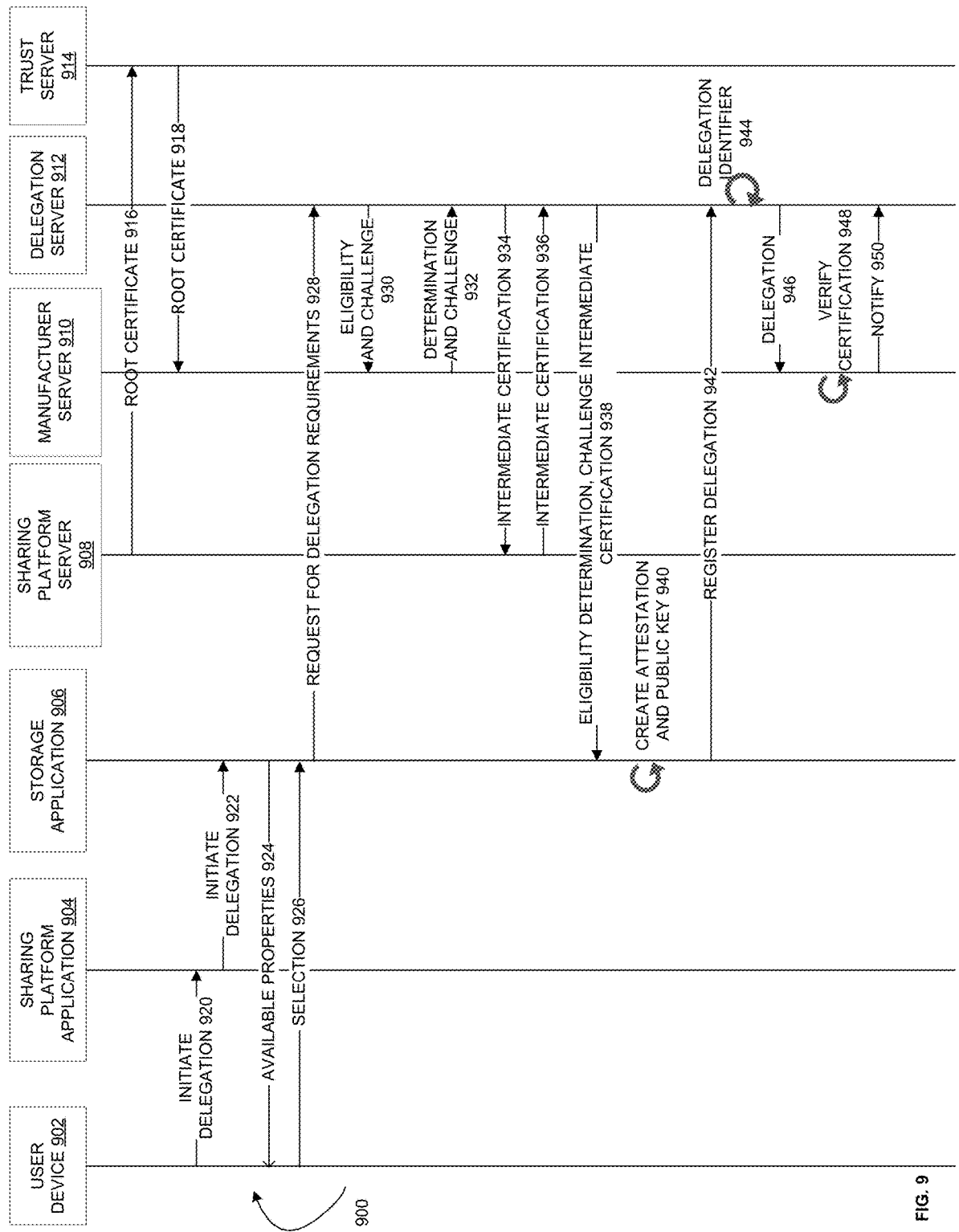
FIG. 9 is a signaling diagram for a provisioning process, in accordance with some embodiments.

FIG. 9 is signaling diagram 900 for a user to delegate access authorization to a sharing platform, in accordance with some embodiments. FIG. 9 differs from FIG. 7, in that the accessory for which the access authority is being delegated is not compatible with the software framework application. Therefore, rather than communicate with a software framework server during the delegation process, communication can be with a manufacturer server 910. The manufacturer server 910 can be a server associated with the manufacturer of the accessory for which delegation of token generation is being sought.

At 916, the sharing platform server 908 can transmit a root certificate to the trust server 714. The trust server 714 can be a computing device server designated for validating a shared platform. The trust server 714 can validate the sharing platform server 708 based on the root certificate.

At 918, the trust server 914 can transmit the root certificate to manufacturer server 910.

At 920, the user, such as an owner, can use a user device 902 to initiate a delegation process. For example, the user can use their smartphone to access a sharing platform application 904 and initiate a delegation process.

At 922, the sharing platform application 704 can transmit a message to a storage application 706 to initiate the delegation process. The storage application 706 can execute on the user device 902 and be, for example, an application that enables the user to store to certificates, coupons, tickets, etc., such as Apple Wallet®.

At 924, the storage application 906 can present via the user device 902 all of the available properties for which the user can delegate token generation authority. The presentation can include properties that include multiple devices.

At 926, the user device 702 can transmit the selected properties to the storage application 906.

At 928, the storage application 906 can transmit a request to identify for delegation requirements for generating a token to the delegation server 912. The delegation server 912 can be a computing device server associated with the storage application 906. For example, if the storage application is Wallet®, the delegation server 912 can be an Apple server.

At 930, the delegation server 912 can transmit a request to the manufacturer server 910 to determine eligibility for delegating authority to generate a token and a challenge.

At 932, the manufacturer server 910 can return a determination of eligibility and a challenge to the delegation server 912. The determination of eligibility can be based, for example, on whether the owner has registered any accessory with the manufacturer, or the manufacturer has any record of purchasing an accessory. The challenge can be a randomly generated number.

At 934, the delegation server 912 can request an intermediate certificate from the sharing platform server 908. The intermediate certificate can be generated by the sharing platform server 708. The intermediate certificate can include the certificate issuer's name (e.g., the sharing platform), the certificate issuers's public key, the root CA's name, and the root CA's signature.

At 936, the sharing platform server 908 can return the intermediate certificate to the delegation server based on the request. The intermediate certificate can be specific for a specific accessory(s) or property. For example, if the user has asked to delegate access authority with respect to the smart lock, the intermediate certificate can be specific to the smart lock. The root certificate can further be used to verify that the intermediate certificate was received from the sharing platform server 908.

At 938, the delegation server 912 can return the challenge, delegation eligibility determination, and the intermediate certificate to the storage application 906.

At 940, the storage application 906 can create a key attestation, which provides the ability to validate the user's identity and eligibility to delegate access authority. The storage application 906 can further create a new public key.

At 942, the storage application 906 can register the delegation of access authority with the delegation server 912.

At 944, the delegation server 912 can create a delegation identifier in response to the registration.

At 946, the delegation server 912 can map the delegation identifier, to a user identifier, to a sharing platform identifier, and to a device identifier in the software framework. If the user has delegated access authority to all devices in a property, the mapping can be from the delegation identifier to the user identifier to the sharing platform identifier to a property identifier that maps to each device identifier at the property. The delegation server 912 can further transmit the user attestation and the intermediate certificate to the software framework.

At 948, the manufacturer server 910 can retrieve the root certificate from the trust provider AND verify the intermediate certificate using the root certificate. For example, the manufacturer server 910 can verify that the intermediate certificate has been signed by the root certificate and that the CA identifying information in the intermediate certificate matches the CA identify information in the root certificate.

At 950, the manufacturer server 910 can notify the delegation server 912 that the delegation creation has been completed.

Figure 10:
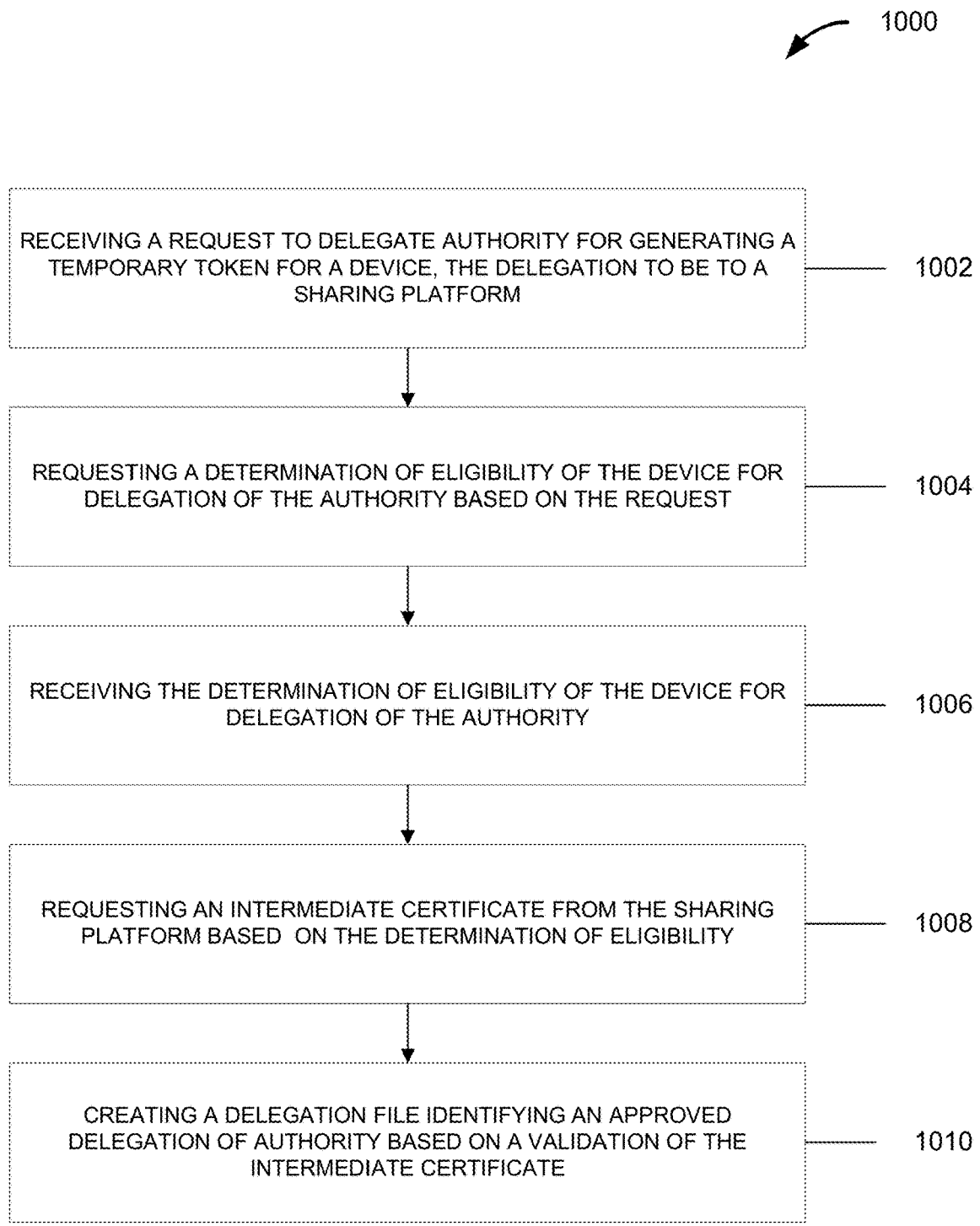
FIG. 10 is a flow diagram for a delegation process, in accordance with some embodiments.

FIG. 10 is a process 1000 for delegating authority to generate a token for a device. At 1002, a computing device can receive a request to delegate authority to generate a token for a device to a sharing platform. The request can be received from a user that has registered their property for rent on the sharing platform. The computing device can be a server, such as a delegation server, that serves one or more functions of a software framework that manages the devices located at the owner's property.

At 1004, the computing device can request a determination of eligibility of the device for delegation of the authority. In other words, the computing device can verify that the owner has the authority to delegate token generation ability to the sharing platform. In some instances, the computing device contacts another server that serves the software framework. This software framework server can include a user account associated with the owner, and a list of devices and accessories that the owner has registered with the software framework.

At 1006, the computing device can receive a determination of eligibility for the device. For example, the owner can have registered a smart shower head to be controlled by the software framework. Therefore, if the owner is requesting that the sharing platform assume responsibility for creating a token to use the smart shower head, the software framework server can verify that the owner has pre-registered the smart shower head. The software framework server can determine that the device is eligible. If, however, the owner has never registered the device on the software framework, and no other association exists, the software framework server can determine that the device is ineligible for delegation of token creation authority.

At 1008, the computing device can request an intermediate certificate from the sharing platform. The intermediate certificate can be issued by the sharing platform and be based on a root certificate for the sharing platform. The intermediate certificate can include a root certificate CA's domain name and the CA's signature. The intermediate certificate can further be associated with the device for which delegation is sought.

At 1010, the computing device can create a delegation file identifying an approved delegation of authority based on a validation of the intermediate certificate. The computing device can further inform the sharing platform that the delegation of token creation authority was successful. The delegation file can be associated with a delegation identifier and stored by the computing device in memory. In this sense, the owner does not have to continuously delegate authority for a device each time that a new guest rents the property.

Figure 11:
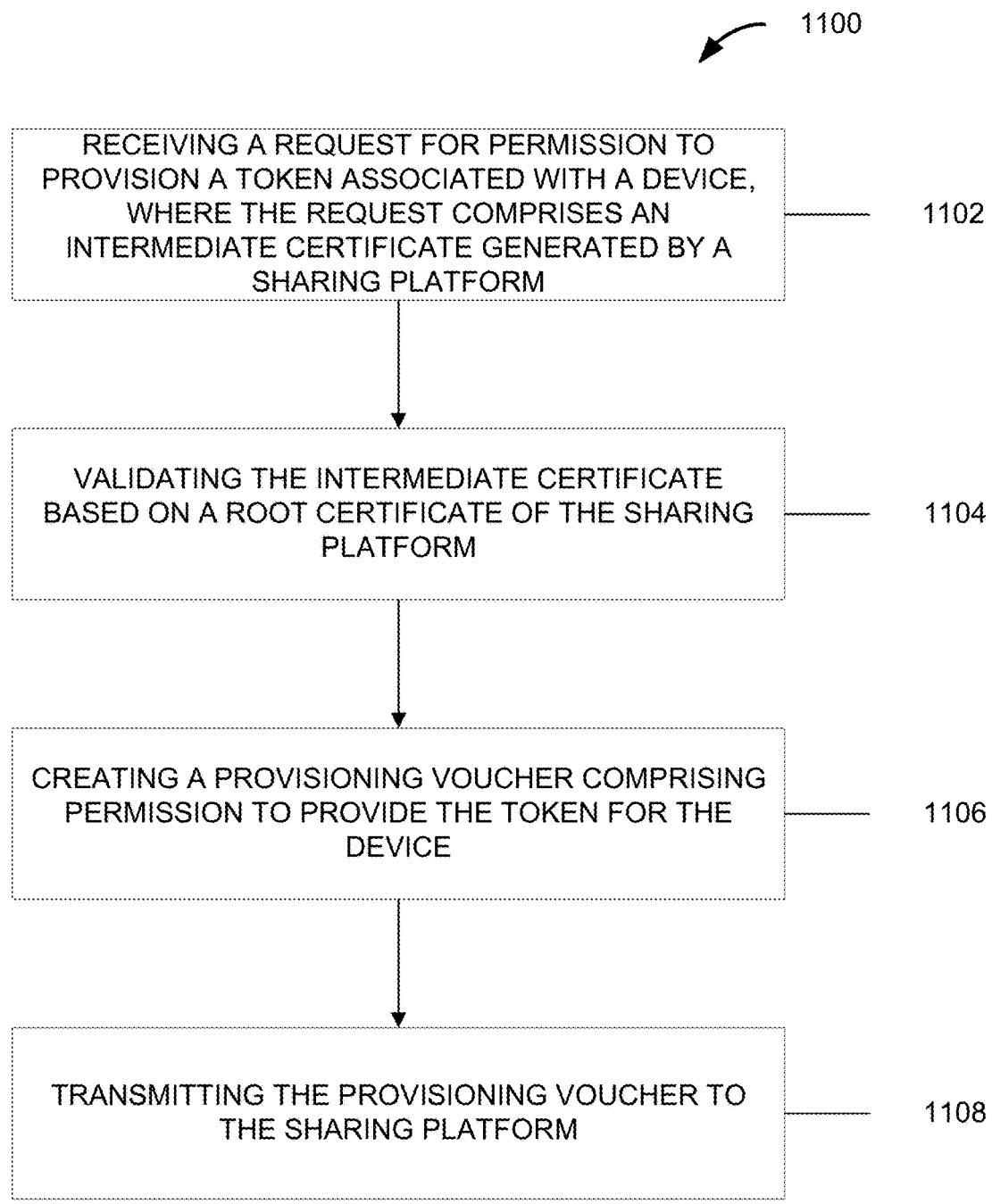
FIG. 11 is a flow diagram for a provisioning process, in accordance with some embodiments.

FIG. 11 is a process 1100 for provisioning a token to provide to a guest, in accordance with some embodiments. At 1102, a computing device can receive a request for permission to provision a token for a device located at an owner's property. The request can include an intermediate certificate associated with a device. The request can be received from a sharing platform that manages the reservation of the property for an owner of the property. The computing device can be, for example, a delegation server that serves a software framework managing the devices located at the owner's property.

At 1104, the computing device can validate the intermediate certificate based on a root certificate of the sharing platform. For example, the computing device can determine whether the intermediate certificate includes a DN of the CA that issued the root certificate and whether the intermediate certificate includes signature of the CA that issued the root certificate.

At 1106, the computing device can create a provisioning voucher for the sharing platform, which includes permission to provision the token for the device. The computing device can create the provisioning voucher based on validating the intermediate certificate.

At 1108, the computing device can transmit the provisioning to the sharing platform. Based on the provisioning voucher, the sharing platform can create a token for the guest.

While specific embodiments have been described, one skilled in the art will recognize that numerous modifications are possible. A single controller may use processes described herein to establish pairings with any number of accessories and to selectively communicate with different accessories at different times. Similarly, a single accessory may be controlled by multiple controllers with which it has established pairings. Any function of an accessory may be controlled by modeling the function as a service having one or more characteristics and allowing a controller to interact with (e.g., read, modify, receive updates) the service and/or its characteristics. Accordingly, protocols and communication processes as described herein may be "universal," meaning that they may be applied in any context with one or more controllers and one or more accessories regardless of accessory function or controller form factor or specific interfaces.

Thus, although specific embodiments have been described, it will be appreciated that embodiments may include all modifications and equivalents within the scope of the following claims.

As described above, one aspect of the present technology is the gathering and use of data available from specific and legitimate sources to improve the delivery of messages from one device to one or more devices. The present disclosure contemplates that in some instances, this gathered data may include personal information data that uniquely identifies or may be used to identify a specific person. Such personal information data may include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, may be used to the benefit of users. For example, the personal information data may be used to deliver a command from a user profile on a computing device to one or more computing devices. Further, other uses for personal information data that benefit the user are also contemplated by the present disclosure. For instance, specific states of devices (e.g., medical care related devices, fitness devices, etc.) associated with the user may be transmitted from a device back to the user profile.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities may subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements may be provided to prevent or block access to such personal information data. For example, such as in the case of token generation services, the present technology may be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Illustrative techniques for using a computing devices to delegate authority to generate a token from an owner to a sharing platform, and provisioning the token by the sharing platform. Some or all of these techniques may, but need not, be implemented at least partially by as those shown at least in FIGS. 1-11 above. While many of the embodiments are described above with reference to computing devices and user devices, it should be understood that other types of computing devices may be suitable to perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C#or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for delegating authority to generate a token from a property owner to a sharing platform, the method comprising:
receiving, by a computing device from a device, a message comprising a request to delegate authority for generating the token for the device, the delegation to be to the sharing platform;
requesting, by the computing device, a determination of eligibility of the device for delegation of the authority based at least in part on the request and a root certificate that validates the sharing platform;
receiving, by the computing device, the determination of eligibility of the device for delegation of the authority;
requesting, by the computing device, an intermediate certificate from the sharing platform based at least in part on the determination of eligibility of the device, the intermediate certificate being associated with the device and being based at least in part on the root certificate; and
creating, by the computing device, a delegation file identifying an approved delegation of authority based at least in part on using the intermediate certificate to validate the sharing platform.

2. The method of claim 1, wherein the method further comprises validating the sharing platform based on comparing a certificate authority of the root certificate with a list of approved certificate authorities.

3. The method of claim 1, wherein the method further comprises:
transmitting a request to validate the intermediate certificate, wherein the request comprises the intermediate certificate; and
receiving a validation of the intermediate certificate, wherein the validation of the sharing platform is based at least in part on identifying a root certificate signature in the intermediate certificate.

4. The method of claim 3, wherein the request to validate the intermediate certificate is transmitted to a third-party manufacturer of the device.

5. The method of claim 1, wherein the method further comprises transmitting a message to the sharing platform that the authority for generating the token has been delegated to the sharing platform.

6. The method of claim 1, wherein the token comprises a start time and an expiration time.

7. The method of claim 1, wherein the delegation file comprises a delegation identifier associated with the device.

8. A computing device for delegating authority to generate a token from a property owner to a sharing platform, the computing device comprising:
a processor; and
a computer-readable medium comprising instructions stored thereon that, when executed by the processor, cause the processor to:
receive a message from a device comprising a request to delegate authority for generating the token for the device, the delegation to be to the sharing platform;
request a determination of eligibility of the device for delegation of the authority based at least in part on the request and a root certificate that validates the sharing platform;
receive the determination of eligibility of the device for delegation of the authority;
request an intermediate certificate from the sharing platform based at least in part on the determination of eligibility of the device, the intermediate certificate being associated with the device;
validate the intermediate certificate based at least in part on the root certificate; and
create a delegation file identifying an approved delegation of authority based at least in part on using the intermediate certificate to validate the sharing platform.

9. The computing device of claim 8, wherein the instructions, when executed, further cause the processor to validate the sharing platform based on comparing a certificate authority of the root certificate with a list of approved certificate authorities.

10. The computing device of claim 8, wherein the instructions, when executed, further cause the processor to:
transmit a request to validate the intermediate certificate, wherein the request comprises the intermediate certificate; and
receive a validation of the intermediate certificate, wherein the validation is based at least in part on identifying a root certificate signature in the intermediate certificate.

11. The computing device of claim 10, wherein the request to validate the intermediate certificate is transmitted to a third-party manufacturer of the device.

12. The computing device of claim 8, wherein the instructions, when executed, further cause the processor to transmit a message to the sharing platform that the authority for generating the token has been delegated to the sharing platform.

13. The computing device of claim 8, wherein the token comprises a start time and an expiration time.

14. The computing device of claim 8, wherein the delegation file comprises a delegation identifier associated with the device.

15. A non-transitory computer-readable medium comprising instructions stored thereon, that when executed by a processor, cause the processor to execute operations comprising:
receiving a message from a device comprising a request to delegate authority for generating a token for the device, the delegation to be to a sharing platform;
requesting a determination of eligibility of the device for delegation of the authority based at least in part on the request and a root certificate that validates the sharing platform;
receiving the determination of eligibility of the device for delegation of the authority;
requesting an intermediate certificate from the sharing platform based at least in part on the determination of eligibility of the device, the intermediate certificate being associated with the device;
validating the intermediate certificate based at least in part on the root certificate; and
creating a delegation file identifying an approved delegation of authority based at least in part on using the intermediate certificate to validate the sharing platform.

16. The non-transitory computer-readable medium of claim 15, wherein the instructions, when executed, further causes the processor to execute operations comprising validating the sharing platform based on comparing a certificate authority of the root certificate with a list of approved certificate authorities.

17. The non-transitory computer-readable medium of claim 15, wherein the instructions, when executed, further causes the processor to execute operations comprising:
 transmitting a request to validate the intermediate certificate, wherein the request comprises the intermediate certificate; and
 receiving a validation of the intermediate certificate, wherein the validation is based at least in part on identifying a root certificate signature in the intermediate certificate.

18. The non-transitory computer-readable medium of claim 17, wherein the request to validate the intermediate certificate is transmitted to a third-party manufacturer of the device.

19. The non-transitory computer-readable medium of claim 15, wherein the instructions, when executed, further causes the processor to execute operations comprising transmitting a message to the sharing platform that the authority for generating the token has been delegated to the sharing platform.

20. The non-transitory computer-readable medium of claim 15, wherein the token comprises a start time and an expiration time.

\* \* \* \* \*